United States Patent [19]

Spirer

[11] Patent Number: 4,961,445
[45] Date of Patent: Oct. 9, 1990

[54] CONNECTING DEVICE FOR CONNECTING LIQUID CONSUMER TO LIQUID SOURCE

[75] Inventor: Steve Spirer, Haworth, N.J.
[73] Assignee: UNEX Corporation, South Hackensack, N.J.
[21] Appl. No.: 392,135
[22] Filed: Aug. 10, 1989
[51] Int. Cl.⁵ .............................................. F16L 29/00
[52] U.S. Cl. ................................ 137/614.04; 285/81; 285/388
[58] Field of Search ........................ 137/614.04, 614; 251/149.4; 285/81, 387, 388

[56] References Cited

U.S. PATENT DOCUMENTS

| | | | |
|---|---|---|---|
| 4,062,571 | 12/1977 | Sicard | 285/388 X |
| 4,165,891 | 8/1979 | Cullaway et al. | 285/81 X |
| 4,193,576 | 3/1980 | White | 251/149.6 |

Primary Examiner—John C. Fox
Attorney, Agent, or Firm—Michael J. Striker

[57] ABSTRACT

A connecting device for connecting a source of hydraulic medium with a consumer of a hydraulic medium, such as a hydraulic tool has a first connecting element to be connected with a consumer and having a passage, a first valve member in the passage, and a spring-biased locking member, and a second connecting element to be connected with a source and having a passage, and a second valve member in the passage and cooperating with the first valve member to form a valve upon assembly of the connecting device. The connecting elements are coupled by a first coupling member turnable on the first connecting element between locked an unlocked positions and a second coupling member turnably supported on the second connecting element and screwable with the first coupling member. When the first coupling member is locked on the first connecting element and the second coupling member is screwed on the first coupling element, the connecting elements are connected with one another and the valve members cooperate with one another so as to open the valve and communicate the throughgoing passages to allow flow of a hydraulic medium from the source to the consumer.

12 Claims, 2 Drawing Sheets

CONNECTING DEVICE FOR CONNECTING LIQUID CONSUMER TO LIQUID SOURCE

BACKGROUND OF THE INVENTION

The present invention relates to a connecting device for connecting a source of liquid medium to a consumer of a liquid medium, such as for example, a hydraulically operated tool.

Connecting devices of the above mentioned general type are known in the art. Known connecting devices include connecting elements which are connectable to the liquid source and the liquid consumer, respectively, and a coupling which couples the connecting elements with one another. In known connecting devices the coupling is formed by a two parts which are screwable with one another through mutually engaging thread. Such devices possess certain disadvantages. One of the many disadvantages is that upon screwing, the coupling is not completely secured against unscrewing and therefore during the operation of the consumer, for example a hydraulic tool, the coupling can unscrew in unauthorized manner with resulting undesirable or even grave consequences. It is believed to be understood that it is desirable to improve the connecting devices so as to eliminate the above mentioned disadvantages.

SUMMARY OF THE INVENTION

Accordingly, it is an object of the present invention to provide a connecting device of the above mentioned general type for connecting a source of liquid with a consumer, which avoids the disadvantages of the prior art.

More particularly, it is an object of the present invention to provide a connecting device which permits quick coupling of a source of liquid with a consumer of liquid and at the same time insures a reliable and permanent operation of the coupling.

In keeping with these objects and with others which will become apparent hereinafter, one feature of the present invention resides, briefly stated, in a connecting device which comprises a first connecting element arranged to be connected with a consumer and having at least one throughgoing passage, at least one first valve member arranged in the throughgoing passage, at least one locking member spring biased in a first axial direction, a second connecting element arranged to be connected with a source and having at least one throughgoing passage, at least one second valve member located in the throughgoing passage and cooperating with the first valve member so as to form a valve upon assembly of the connecting device, and coupling means for coupling the first connecting element with the second connecting element and including a first coupling member turnably supported on the first connecting element between a locked position in which it is locked by the locking member to prevent its rotation and an unlocked position, the first coupling element being provided with a first thread and a second coupling element turnably supported on the second connecting element and having a second thread which is screwable with the first thread of the first coupling element so that when the first coupling element is locked on the first connecting element and the second coupling element is screwed on the first coupling element, the connecting elements are connected with one another and the valve members cooperate with one another so as to open the valve and communicate the throughgoing passages to allow passage of a hydraulic medium from the source to the consumer.

In accordance with another feature of the present invention in the inventive connecting device the first connecting element has an outer surface provided with at least one groove, the first coupling element having an inner surface provided with at least one projection such that the inner surface of the coupling element is rotatably supported on the outer surface of the connecting element, and the first coupling element is axially movable relative to the first connecting element in the first axial direction so that the projection slides in the groove in the first axial direction and upon leaving the groove the first coupling element can be turned relative to the first connecting element to be locked by the locking member.

It is still another feature of the present invention that in the connecting device the projection of the first coupling element has a locking opening formed so that upon turning of the first coupling element on the first connecting element the locking member engages in the locking opening.

In the connecting device in accordance with the present invention the first connecting element has a radially extending flange having two end surfaces, the locking member being arranged in the flange and extending outwardly beyond one of the end surfaces, the first coupling element being formed so that after the projection has passed the groove it engages behind the one end surface of the flange.

It is a further feature of the present invention that in the connecting device means are provided for orienting the elements relative to one another and including at least one orienting hole formed in one of the connecting elements and at least one axially extending orienting projection provided in the other of the connecting elements and engageable in the orienting hole during assembly of the connecting device.

Still a further feature of the present invention the first connecting element has a spring with one end biasing the locking member and another end, and a pin supporting the other end of the spring and extending outwardly beyond the first connecting element, the second connecting element having a receiving hole in which the pin engages upon assembly of the connecting device.

In the connecting device of the present invention the first connecting element has means forming a first valve seat, the valve first member being formed as a pin which is spring biased toward the first valve seat to its closed position, the second connecting element having means forming a second valve seat, the second valve member being formed as a ball which is spring biased toward the second seat to its closed position, the pin and the ball being arranged so that in the assembled condition of the connecting device the pin and the ball are brought in contact with one another with displacement of the pin and the ball away of the first and the second valve seats, respectively so as to open the valve and allow passage of the hydraulic medium through the throughgoing passages.

An additional feature of the present invention is that at least one of the coupling elements is provided with means for facilitating its screwing with the other of the coupling elements.

An additional feature of the present invention is that the at least one coupling element has an outer surface, the facilitating means including a knurling provided on the outer surface.

A further feature of the present invention is that the first connecting element includes a plurality of such first throughgoing passages and such first valve members, while the second connecting element is provided with a plurality of such second throughgoing passages and such second valve members cooperating with the first throughgoing passages and the first valve members, respectively.

Still an additional feature of the present invention is that the first connecting element has means for connecting with a consumer, the connecting means including a receiving opening for rotatably receiving a consumer part, the first throughgoing passage being open into the receiving opening.

Still a further feature of the present invention is that the second connecting element has means for connecting with a source and including at least one threaded opening for threading in a source part.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
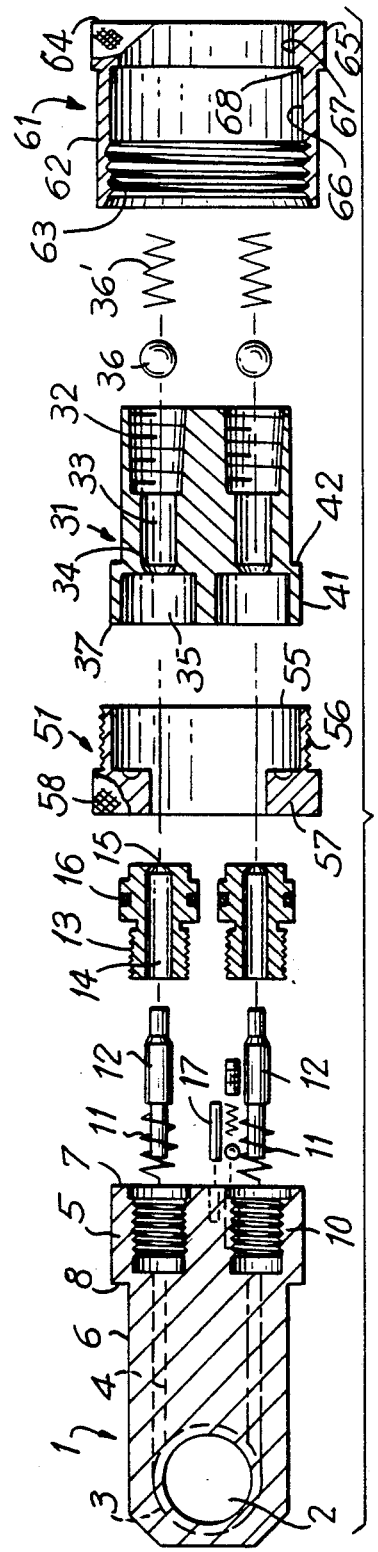
FIG. 1 is an exploded perspective view of a connecting device in accordance with the present invention.
Figure 4:
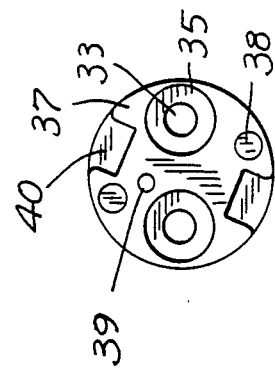
FIG. 4 is an end view of a second connecting element for connecting to a liquid source of the inventive connecting device.
Figure 3:
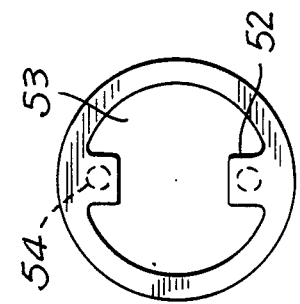
FIG. 3 is an end view of a first coupling element of the inventive connecting device.
Figure 2:
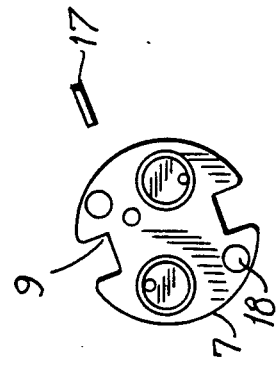
FIG. 2 is an end view of a first connecting element connectable to a consumer of the connecting device in accordance with the present invention.

A connecting device for connecting a source of liquid with a consumer of liquid such as for example a tool has a first connecting element which is identified as a whole with reference numeral 1. The connecting element 1 is provided in its one end portion with a receiving opening 2 in which a turnable part connected with the tool is inserted. Two grooves 3 are formed in the wall which limits the receiving opening 2, and two first passages 4 extend from the grooves 3 parallel to an axis of the first connecting element 1. When the above mentioned turnable part of the tool is inserted in the receiving opening 2, a passage provided in the part of the tool is brought in communication with the grooves 3 and as a result with the passages 4. The connecting element 1 has a flange 5 with an outer peripheral surface which extends radially outwardly beyond a peripheral surface 6 of a remaining portion of the connecting element. The flange 5 has front and rear surfaces 7 and 8 and is provided with two throughgoing grooves 9. The flange further has two bores 10 which communicate with the passages 4 and receive each a spring 11 and a valve pin 12. Each bore 10 also receives a valve stud 13 which is screwed in the bore by means of a thread provided on the stud and in the bore wall. Each stud 13 in turn has an inner passage 14 which at its right end is provided with a first seat 15.

The connecting device is provided with orienting means, a part of which is an orienting pin 17. The orienting pin 17 can be inserted in a small hole in the end surface 7 of the flange 5. The connecting element 1 is further provided with locking means for locking the device in an assembled condition. For this purpose the flange 5 of the connecting element 1 has two receiving holes 18 each accommodating a locking ball 19 spring biased by a spring 20 to the left in the drawings. One end of the spring 20 abuts against the ball 19, while the other end is supported against a pin 21 extending outwardly beyond the surface 7 of the flange 5.

The connecting device of the present invention further includes a second connecting element identified as a whole with reference numeral 31. The second connecting element 31 is connectable to a liquid source, for example to hoses extending from a liquid pump. For this purpose the second connecting element has two threaded holes 32 in which respective hoses can be screwed in. Passages 33 are further provided in the second connecting element 31 and each have a second seat 34. Finally, the connecting element 31 has two receiving holes 35. The passages 33 connect the receiving holes 32 with the holes 35. Each of the holes 35 is formed for receiving a greater diameter portion of the valve stud 14. The O-rings seal the greater diameter portions of the valve studs 14 relative to the holes 35. Each of the passages 33 receives a valve ball 36= and a spring 36 which biases the ball 36 against the seat 34 of the respective passage 33. The connecting member 31 has an end surface 37 facing toward the end surface 7 of the flange 5 of the connecting element 1 in the assembled condition. The end surface 37 is provided with two receiving holes 38 for receiving the pins 21 of the connecting element 1. It is also provided with an orienting hole 39 for receiving the orienting pin 17 of the connecting element 1. Finally, the connecting element 31 is provided on its peripheral surface with two throughgoing grooves 40 corresponding to the grooves 9 of the first connecting element 1.

The connecting device of the present invention further has a first coupling member 51 and a second coupling to member 61. The first coupling to member 51 has two projections 52 with a shape complementary to the shape of the grooves 9 of the connecting element 1 and the grooves 40 of the connecting element 31. The coupling element 51 is ring-shaped and has a central opening 53 with a diameter corresponding to the outer diameter of the flange 5 of the connecting element 1. Each of the projections 52 has a hole 54 for receiving the locking ball 19 as will be explained hereinbelow. A portion 55 of a smaller diameter is provided with an outer thread 56, while another portion 57 of a greater diameter is provided with an outer knurling 58.

The second coupling member 61 has a portion of a smaller diameter 62 provided with an inner thread 33 which corresponds to the outer thread 56 of the first coupling member 51. It further has a portion of a greater diameter 64 provided with an outer knurling 65. The coupling member 61 has an inner stepped opening with an opening portion 66 with a diameter which is somewhat greater than the outer diameter of the portion 41 of the connecting element 31, and an opening portion 67 with a diameter which is smaller than the outer diameter portion 41. Thereby a shoulder 68 is formed between the opening portion 66 and 67 for axially retaining the connecting member 31 in the coupling element 61 in assembled condition.

Figure 5:
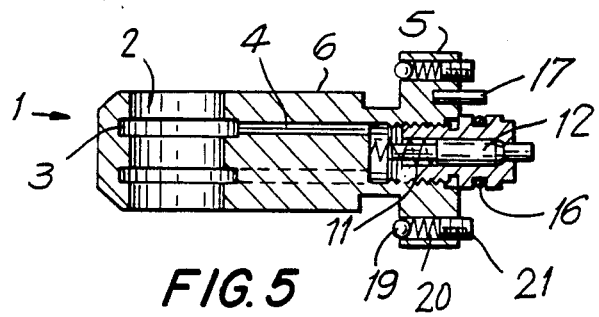
FIGS. 5 and 6 are views showing two assemblies connected to a consumer and connected to a source, and connectable with one another.
Figure 6:
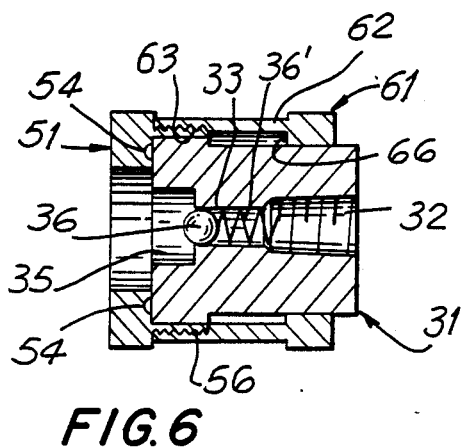
Figure 7:
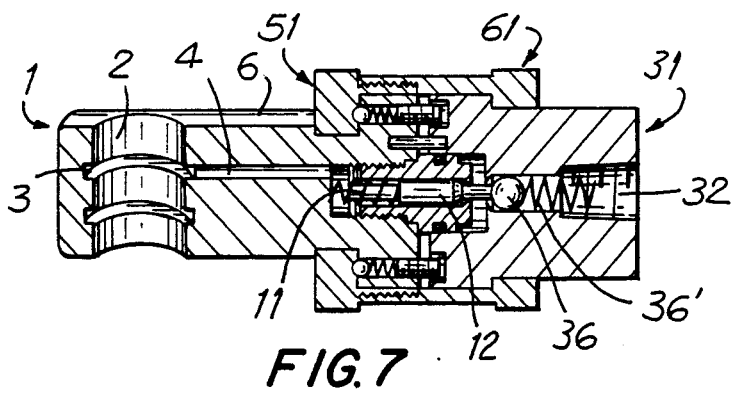
FIG. 7 is a view showing the two assemblies in an assembled condition.

The connecting device in accordance with the present invention is assembled in the following manner. First the connecting element 31 is assembled by inserting the balls 36 in the passages 33 and the spring 36= at the rear ends of the balls, wherein the spring 36= can be retained either by hoses extending from a liquid source or by any known retention elements. The assembled connecting element 31 is inserted in the coupling member 61 so that a rear shoulder 42 of the portion 41 of the connecting element 31 abuts against the shoulder 68 of the coupling member 61. Then the coupling member 51 is screwed into the coupling member 61 by interengaging threads 56 and 63. An assembly which is shown in FIG. 6 is thereby formed. After this, the connecting element 1 is assembled by inserting the springs 11 and the pins 12 into the openings 10 and screwing the valve studs 13 into these openings. The locking members 19 and the springs 20 are inserted in the receiving holes 18 and then the pins 21 are screwed in the holes. The orienting pin 17 is inserted into the opening in the surface 7. The connecting element 1 is assembled to form an assembly shown in FIG. 5. These two assemblies are preassembled, before a user has to connect the liquid source with the consumer of liquid. For connecting the liquid source with the liquid consumer the user needs only to push the assembly 2 axially over the assembly 1 so that the projections 52 extend through the grooves 9, pass the grooves, exit beyond the surface 8 of the flange 5. Then after this the assembly 2 is turned about an axis of the connecting device relative to the assembly 1 so that the openings 54 coincide with the balls 19 and the balls 19 are spring biased by the springs 20 into the openings 54. In this position a reliable connection between the two assemblies is achieved. The axial dimensions of the openings 10 and 35, the pins 12 and the balls 36, and the positions of the seats 15 and 34 are selected so that in the assembled condition the pins 12 and the balls 36 not only abut against one another by their mutually facing surfaces, but they also are displaced relative to their seats 15 and 34 away from an abutment against the seats. As a result, caps are produced between the seats 15 and 34 and the valve pins 12 and balls 36, respectively to allow hydraulic medium to flow along the paths 32, 33, 35, 14, 10, 4, 3, 2 to the consumer.

The decoupling of the liquid source from the liquid consumer is performed in a reversed order, namely by turning the assembly 2 relative to the assembly 1 in an opposite direction and axially moving the assembly 2 away of the assembly 1 or vice versa.

It is to be understood that while in the shown embodiment there are two passages communicating a liquid source with a liquid consumer with the respective parts of the passages, the connecting device can be provided with only one passage, or with more than two passages and respective parts in them for supplying the liquid to or withdrawing the liquid from the consumer along the number of passeges different from two.

It will be understood that each of the elements described above, or two or more together, may also find a useful application in other types of constructions differing from the types described above.

While the invention has been illustrated and described as embodied in a connecting device for connecting a liquid consumer to a liquid source, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A connecting device for connecting a source of hydraulic medium with a consumer of a hydraulic medium, such as a hydraulic tool, comprising a first connecting element arranged to be connected with a consumer and having at least one throughgoing passage, at least one first valve member arranged in said throughgoing passage, at least one locking member spring biased in a first axial direction; a second connecting element arranged to be connected with a source and having at least one throughgoing passage, at least one second valve member located in said throughgoing passage and cooperating with said first valve member so as to form a valve upon assembly of the connecting device; and coupling means for coupling said first connecting element with the second connecting element and including a first coupling member provided with a first thread and supported on said first connecting element turnably between a locked position in which it is locked by said locking member to prevent its rotation and an unlocked position, and a second coupling member turnably supported on said second connecting element and having a second thread which is screwable with said first thread of said first coupling member so that when said first coupling member is locked on said first connecting element and said second coupling member is screwed on said first coupling member, said connecting elements are connected with one another and said valve members cooperate with one another so as to open said valve and communicate said throughgoing passages to allow passage of a hydraulic medium from the source to the consumer.

2. A connecting device as defined in claim 1, wherein said first connecting element has an outer surface provided with at least one groove, said first coupling member having an inner surface provided with at least one projection such that said inner surface of said first coupling member is rotatably supported on said outer surface of said connecting element, and said first coupling member being axially movable relative to said first connecting element in said first axial direction so that said projection slides in said groove in said first axial direction and upon leaving said groove said first coupling member can be turned relative to said first connecting element to be locked by said locking member.

3. A connecting device as defined in claim 2, wherein said projection of said first coupling member has a locking opening formed so that upon turning of said first coupling member on said first connecting element said locking member engages in said locking opening.

4. A connecting device as defined in claim 3, wherein said first connecting element has a radially extending flange having two end surfaces, said locking member being arranged in said flange and extending outwardly beyond one of said end surfaces, said first coupling member being formed so that after said projection has passed said groove it engages behind said one end surface of said flange.

5. A connecting device as defined in claim 1; and further comprising means for orienting said elements relative to one another and including at least one orienting hole formed in one of said connecting elements and at least one axially extending orienting projection provided in the other of said connecting elements and engageable in said orienting hole during assembly of the connecting device.

6. A connecting device as defined in claim 1, wherein said first connecting element has a spring with one end biasing said locking member and another end, and a pin supporting the other end of said spring and extending outwardly beyond said first connecting element, said second connecting element having a receiving hole in which said pin engages upon assembly of the connecting device.

7. A connecting device as defined in claim 1, wherein said first connecting element has means forming a first valve seat, said valve first member being formed as a pin which is spring biased toward said first valve seat to its closed position, said second connecting element having means forming a second valve seat, said second valve member being formed as a ball which is spring biased toward said second seat to its closed position, said pin and said ball being arranged so that in the assembled condition of the connecting device said pin and said ball are brought in contact with one another with displacement of said pin and said ball away of said first and said second valve seats, respectively so as to open said valve and allow passage of the hydraulic medium through said throughgoing passages.

8. A connecting device as defined in claim 1, wherein at least one of said coupling members being provided with means for facilitating its screwing with the other of said coupling elements.

9. A connecting device as defined in claim 8, wherein said at least one coupling member has an outer surface, said facilitating means including a knurling provided on said outer surface.

10. A connecting device as defined in claim 1, wherein said first connecting element includes a plurality of such first throughgoing passages and such first valve members, while said second connecting element is provided with a plurality of such second throughgoing passages and such second valve members cooperating with said first throughgoing passages and said first valve members, respectively.

11. A connecting device as defined in claim 1, wherein said first connecting element has means for connecting with a consumer, said connecting means including a receiving opening for rotatably receiving a consumer part, said first throughgoing passage being open into said receiving opening.

12. A connecting device as defined in claim 11, wherein said second connecting element has means for connecting with a source and including at least one threaded opening for threading in a source part.

* * * * *